United States Patent
Lammers et al.

(10) Patent No.: US 11,542,678 B2
(45) Date of Patent: Jan. 3, 2023

(54) PILE INSTALLATION SYSTEM FOR AN OFFSHORE FOUNDATION CONSTRUCTION AND METHOD OF INSTALLING A PILE

(71) Applicant: VALLOUREC DEUTSCHLAND GmbH, Dusseldorf (DE)

(72) Inventors: Andreas Lammers, Boulogne-Billancourt (FR); Ralf Hojda, Boulogne-Billancourt (FR); Daniel Stroetgen, Boulogne-Billancourt (FR); Lieven Van Melckebeke, Boulogne-Billancourt (FR); Stefan Reins, Boulogne-Billancourt (FR); Hans Pihl, Boulogne-Billancourt (FR); Niels Haakman, Boulogne-Billancourt (FR); Stefan Bardenhagen, Boulogne-Billancourt (FR); Stefan Doerfeldt, Boulogne-Billancourt (FR); Christophe Jaeck, Boulogne-Billancourt (FR); Martin Eilers, Boulogne-Billancourt (FR); Jens Fiebig, Boulogne-Billancourt (FR); Phillip Jorgensen, Boulogne-Billancourt (FR)

(73) Assignee: VALLOUREC DEUTSCHLAND GmbH, Dusseldorf (DE)

( * ) Notice: Subject to any disclaimer, the term of this patent is extended or adjusted under 35 U.S.C. 154(b) by 0 days.

(21) Appl. No.: 17/251,564

(22) PCT Filed: Jun. 18, 2019

(86) PCT No.: PCT/EP2019/066087
§ 371 (c)(1),
(2) Date: Dec. 11, 2020

(87) PCT Pub. No.: WO2019/243365
PCT Pub. Date: Dec. 26, 2019

(65) Prior Publication Data
US 2021/0254300 A1    Aug. 19, 2021

(30) Foreign Application Priority Data

Jun. 18, 2018 (EP) ..................... 18178336

(51) Int. Cl.
*E02D 13/04* (2006.01)
*E02D 27/52* (2006.01)
(Continued)

(52) U.S. Cl.
CPC ............. *E02D 27/52* (2013.01); *E02D 5/285* (2013.01); *E02D 13/04* (2013.01); *E02D 27/425* (2013.01);
(Continued)

(58) Field of Classification Search
CPC .......... E02D 13/04; E02D 5/285; E02D 27/52
See application file for complete search history.

(56) References Cited

U.S. PATENT DOCUMENTS 2,587,638 A * 3/1952 Meier ..................... E21B 19/08
173/10
4,138,199 A    2/1979 Gendron et al.
(Continued)

FOREIGN PATENT DOCUMENTS

GB    2 448 358 A    10/2008
JP    61-98820 A    5/1986
(Continued)

OTHER PUBLICATIONS https://www.merriam-webster.com/dictionary/frame%20of%20reference.*
International Search Report dated Sep. 5, 2019 in PCT/EP2019/066087 filed on Jun. 18, 2019.

*Primary Examiner* — Sean D Andrish
(74) *Attorney, Agent, or Firm* — Oblon, McClelland, Maier & Neustadt, L.L.P.

(57) ABSTRACT

This pile installation system for an offshore foundation construction includes a main body, a movable part and a first means for attaching the main body to a frame of reference. This frame of reference is configured to act as a counterweight. It further includes a second means for attaching the movable part to a pile to be installed, and the movable part may be moved, with respect to the main body, in translation about the direction of an insertion axis.

22 Claims, 10 Drawing Sheets

(51) Int. Cl.
  *E02D 5/28*     (2006.01)
  *E02D 27/42*    (2006.01)
  *E02D 27/50*    (2006.01)

(52) U.S. Cl.
  CPC ...... *E02D 27/50* (2013.01); *E02D 2250/0061* (2013.01)

(56) References Cited

U.S. PATENT DOCUMENTS

| | | | |
|---|---|---|---|
| 4,900,198 A * | 2/1990 | Hoaki | E02D 9/005 405/303 |
| 8,834,071 B2 * | 9/2014 | Vandenbulcke | E02D 27/52 405/227 |
| 8,998,540 B2 * | 4/2015 | Swingler | E02D 27/42 405/225 |
| 2010/0119309 A1 | 5/2010 | Gibberd | |
| 2011/0170956 A1 | 7/2011 | Vandenbulcke et al. | |
| 2011/0222968 A1 | 9/2011 | Ong | |
| 2012/0213594 A1 * | 8/2012 | Vandenbulcke | E02D 27/52 405/228 |
| 2014/0321923 A1 | 10/2014 | Vo | |

FOREIGN PATENT DOCUMENTS

| | | |
|---|---|---|
| WO | WO 2010/059031 A2 | 5/2010 |
| WO | WO 2013/110096 A1 | 7/2013 |

\* cited by examiner

PILE INSTALLATION SYSTEM FOR AN OFFSHORE FOUNDATION CONSTRUCTION AND METHOD OF INSTALLING A PILE

BACKGROUND OF THE INVENTION

The present invention relates to the technical field of offshore foundation constructions, in particular offshore foundation constructions intended to support an offshore wind turbine. More specifically, the invention relates to a system for installing a foundation pile of such an offshore foundation construction.

DESCRIPTION OF THE RELATED ART

Offshore devices such as offshore wind turbines usually rest on a support structure including foundation elements which are often piles. Usually, the offshore foundation construction is secured to a seabed by the foundation piles driven into the seabed. An upper end of the foundation piles is attached to the structure optionally by means of pile sleeves.

Traditionally, the foundation piles are driven into the seabed by the so-called hammering method including the application of a large load on a foundation pile to be driven during a short duration, for instance less than one second for one blow, and repeating the application of this load.

A major drawback of the hammering method is that it generates significant noise levels and vibrations which may be harmful to the wildlife surrounding the offshore foundation construction and the offshore device. Due to environmental reasons for noise mitigation the normal pile installation leads to very time consuming mitigation measures and the corresponding costs. Furthermore, the application of a large load results in a risk of deforming or weakening the foundation pile and requires cumbersome actuators.

BRIEF SUMMARY OF THE INVENTION

The invention aims at overcoming the above-mentioned drawbacks.

More specifically, the invention aims at allowing to install a foundation pile of an offshore foundation construction in a way more respectful of the surrounding wildlife and decreasing the risk of deforming or weakening the foundation piles.

According to a first aspect of the invention, it is proposed a pile installation system for an offshore foundation construction, including a main body, a movable part and a first means for attaching the main body a frame of reference. This frame of reference is configured to act as a counterweight. The frame of reference may be the offshore foundation construction or a template laid on the seabed prior to installation of the piles.

According to one of its general features, the system further includes a second means for attaching the movable part to a pile to be installed, and the movable part may be moved, with respect to the main body, in translation about the direction of an insertion axis.

This system allows installing the pile by pushing instead of hammering. By pushing, the installation force is lower and exerted over a longer period. This decreases the sound emitted and the fatigue of the pile.

In an alternative embodiment, the first means for attaching is a means for locking the main body to the frame of reference. As well, the second means for attaching may be a means for locking the movable part to a pile to be installed.

In a preferred embodiment, the movable part may further be moved, with respect to the main body, in rotation about the insertion axis.

Such a preferred embodiment allows simultaneously pushing and rotating the pile. This results in decreasing the power required for installing the pile. The sound emitted and the fatigue of the pile are even more decreased.

According to a specific embodiment, the main body includes an elongated sleeve extending along the insertion axis. Such an elongated sleeve maintains the piles to be installed distant from the system during feeding, and thus reduces the risk of damaging the system and/or the offshore foundation construction.

Preferably, the length of the elongated sleeve is within a range 5 m to 30 m.

By foreseeing such a range, an upper end of the sleeve extends above the sea level in shallow water. It facilitates even more the supply of piles to be installed, so as to save time, costs and to protect the foundation structure from pile manipulation mistake.

In another embodiment, the elongated sleeve includes a distal end portion, the distal end portion being frustoconical and having a first circular axial end adjacent to the main body and a second circular axial end opposite to the main body, the second circular axial end having a larger diameter than the diameter of the first circular axial end.

Such a design of the distal end portion facilitates the insertion into the elongated sleeve of a pile to be installed.

One may also foresee that the main body may include a second elongated sleeve including a lifting device.

The lifting device allows lifting a part of the system so as to allow pivoting the system in order to drive a pile associated with another peripheral sleeve of the offshore foundation construction. By accommodating the lifting device in a second elongated sleeve, it is provided a simple way to control distantly the lifting of the part of the system.

In an advantageous variation, the pile installation system may include at least one carrousel so configured to accommodate at least two piles, to pivot the piles about a pivot axis and to supply the piles one at a time for installation. The pivot axis is typically located at a center of the carrousel. This variation makes it possible to store two or more piles in the installation system and avoid having to supply every one of them from above sea level during installation of an offshore foundation construction, whereby the amount of vessel crane operations can be decreased.

Advantageously, at least one of the first means for attaching and the second means for attaching is encapsulated.

One may also foresee a power generation unit and a driving unit, the driving unit being intended to use power from the power generation unit to actuate the movable part, the power generation unit being intended to be installed on a vessel, the driving unit being installed in vicinity of the main body.

Such a location of the power generation unit and the driving unit allows reducing the underwater volume of the system.

Several variants may be foreseen for the kind of power of the power generation unit and the driving unit. In a first variant embodiment, the power generation unit includes at least one hydraulic pump and the driving unit includes at least one hydraulic actuator such as a hydraulic motor. In a second variant embodiment, the power generation unit includes at least one electric generator and the driving unit includes at least one electric actuator such as an electric motor. These variants may be combined such that the power generation unit may include both at least one hydraulic pump and at least one electric generator, and the driving unit may include at least one hydraulic actuator and at least one electric actuator.

Such variant embodiments are especially adapted for providing a distant power generation unit located above the sea level and a proximal underwater driving unit.

One may also foresee a transmission unit comprising a driving screw and a ring gear.

In an embodiment, the second means for attaching includes at least three radially movable chucks.

Such movable chucks allow both centering and tightening the pile to be installed with respect to the movable part.

Preferably, the second means for attaching includes at least one supplementary radially movable chuck.

Such a supplementary chuck allows improving the tightening of the pile to be installed with respect to the movable part.

In a further embodiment, the first means for attaching is intended to attach the main body to a structure or an adapter of the offshore foundation construction.

With such a design of the first means for attaching, the structure is acting as the frame of reference and thus avoids using ballast weights. Under water, the buoyancy of a ballast weight is relatively important so that it is necessary to increase the volume of the ballast weight.

Preferably, the first means for attaching includes a rod and a clamping means for attaching the rod to a central sleeve of an adapter of the offshore foundation construction.

It is thus provided a compact solution particularly well adapted to an offshore foundation construction having adapters including a central sleeve and at least one peripheral sleeve.

Preferably, the main body is mobile in rotation with respect to the rod about the axis of the rod.

When used with an offshore foundation construction having adapters including a central sleeve and at least two peripheral sleeves, the main body may easily be pivoted about the axis of the central sleeve so as to be moved from a first peripheral sleeve to a second peripheral sleeve without loosening the first means for attaching.

In a preferred embodiment, the first means for attaching further includes a pivoting means for actuating the rotation of the main body with respect to the rod.

Preferably, the pivoting means includes a motor and a pinion, the rod having outer axial grooves able to cooperate with the pinion.

According to another aspect of the invention, it is proposed a method of installing a pile of an offshore foundation construction, including attaching the main body of a pile installation system as set forth above to the frame of reference, providing the pile installation system with a pile to be installed, attaching the movable part of the pile installation system to the pile to be installed, and moving the movable part, with respect to the main body, in translation about the direction of an insertion axis.

In a preferred embodiment, the method further includes moving the movable part, with respect to the main body, in rotation about the insertion axis. The translation and the rotation of the movable part with respect to the main body are preferably implemented simultaneously. The movable part may be moved, with respect to the main body, simultaneously in translation and in rotation about the insertion axis.

The method may further include using a template during installation of the pile. The template may be used prior to installing the offshore foundation construction or any part of the same, such as a structure or an adapter of the offshore foundation construction. The template may be used together with one or more adapters of the offshore foundation construction. The template enables splitting the installation of the offshore foundation construction into sequences and enables precise positioning of the pile or piles in the seabed and/or precise simultaneous positioning of the adapter or adapters with the pile or piles. The template may be the frame of reference.

BRIEF DESCRIPTION OF THE SEVERAL VIEWS OF THE DRAWINGS

The present invention and its advantages will be better understood by studying the detailed description of a specific embodiment given by way of non-limiting examples and illustrated by the appended drawings on which.

DETAILED DESCRIPTION OF THE INVENTION

Figure 1:
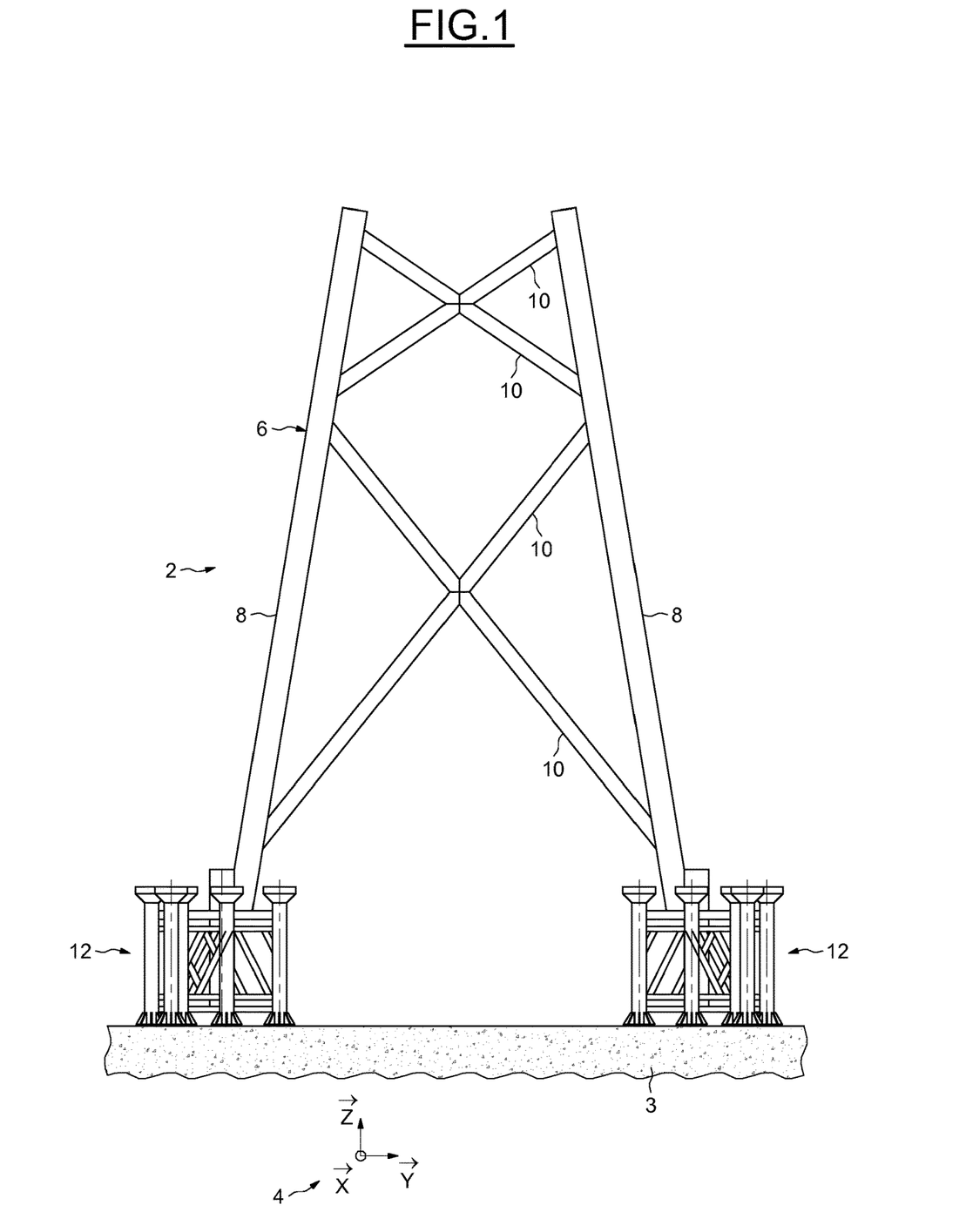
FIG. 1 is a side view of an offshore foundation construction.

With reference to FIG. 1, it is schematically depicted an offshore foundation construction 2. The offshore foundation construction 2 aims at resting on a seabed 3 and at supporting an offshore device (not depicted), in particular an offshore wind turbine. Nonetheless, the offshore foundation construction 2 may be used for supporting another kind of offshore device, such as an offshore hydrocarbon production platform.

It is defined an orthonormal direct vector base 4 attached to the offshore foundation construction 2. The base 4 consists of a vector $\vec{x}$, a vector $\vec{y}$, and a vector $\vec{z}$.

In the present application, terms "vertical", "low", "down", "above" and "up" will be understood as referring relative to the base 4 when the offshore foundation construction 2 is normally installed on a horizontal seabed, that is assuming that the vector $\vec{z}$ is vertically upwards directed.

The word "cylindrical" will be understood according to its common definition, being namely that a cylindrical surface is a surface consisting of all the points on all the lines which are parallel to a given line and which pass through a fixed plane curve in a plane not parallel to the given line.

The offshore foundation construction 2 includes a structure 6. The structure 6 includes four main legs 8, only two legs 8 being visible on the side view of FIG. 1. The structure 6 also includes a plurality of braces 10. The braces 10 connect mechanically a leg 8 with another leg 8. On the side view of FIG. 1, only four braces 10 are visible.

In the depicted embodiment, the structure 6 is a jacket. However, it would be possible without departing from the scope of the invention to have a structure having a different design, being for instance a tripod.

The offshore foundation construction 2 includes, for each main leg 8, an adapter 12. That is, in the depicted embodiment, the offshore foundation construction 2 includes four adapters 12, only two of them being visible on the side view of FIG. 1. The adapters 12 are intended to form the mechanical connection between the structure 6 and foundation piles 22 (see FIGS. 4 and 8). The foundation piles 22 are cylindrical about the direction of the vector $\vec{z}$ and have a circular radial cross section about an axis of revolution 21 with a diameter $d_{22}$. In the depicted embodiment, twenty piles 22 may be installed in order to secure the construction 2 to the seabed 3. In the following description, unless indicated otherwise, the word "axial" will be understood as referring to the axis of revolution of a pile 22. The piles 22 are not depicted on all the figures for a better clarity of the drawings. For each main leg 8, an adapter 12 is attached to a lower end of the main leg 8. In the depicted embodiment, the adapters 12 are welded to the legs 8 before that the offshore foundation construction 2 is launched in the sea.

Figure 2:
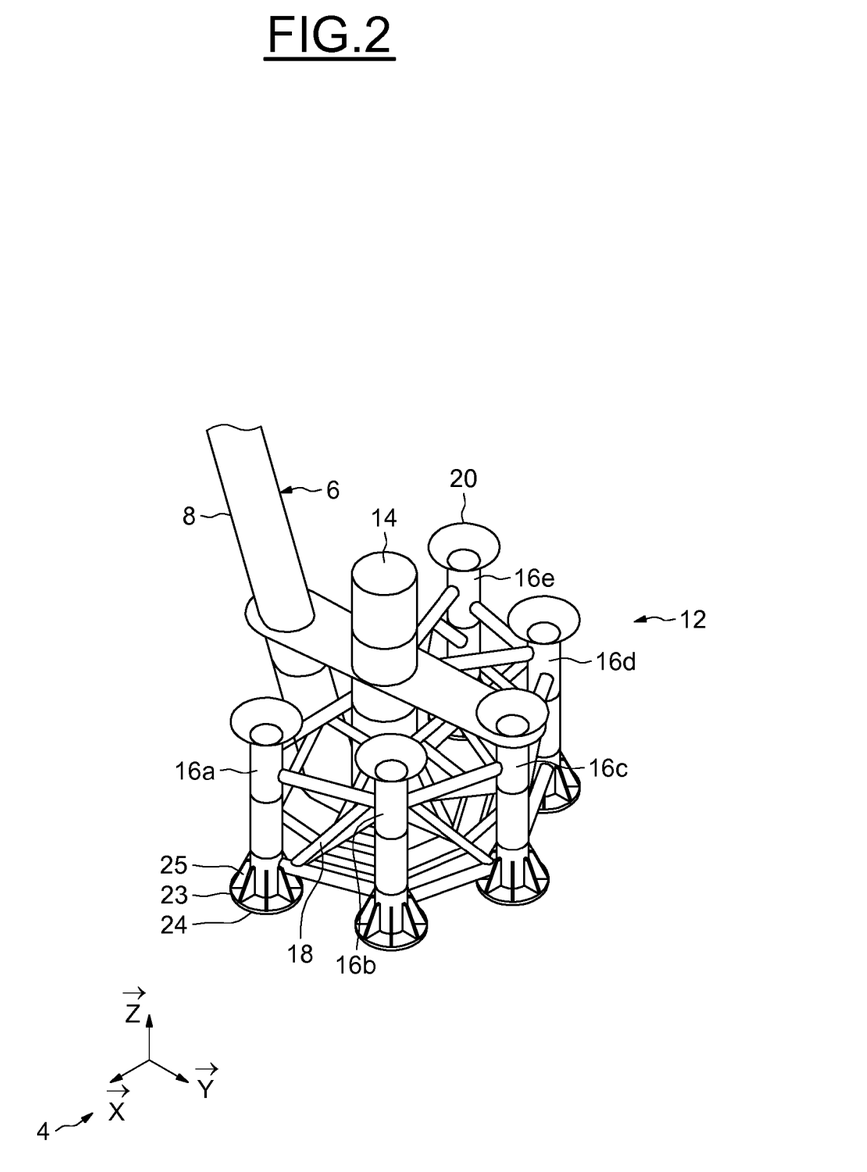
FIG. 2 is an isometric view of an adapter of the offshore foundation construction of FIG. 1.
Figure 3:
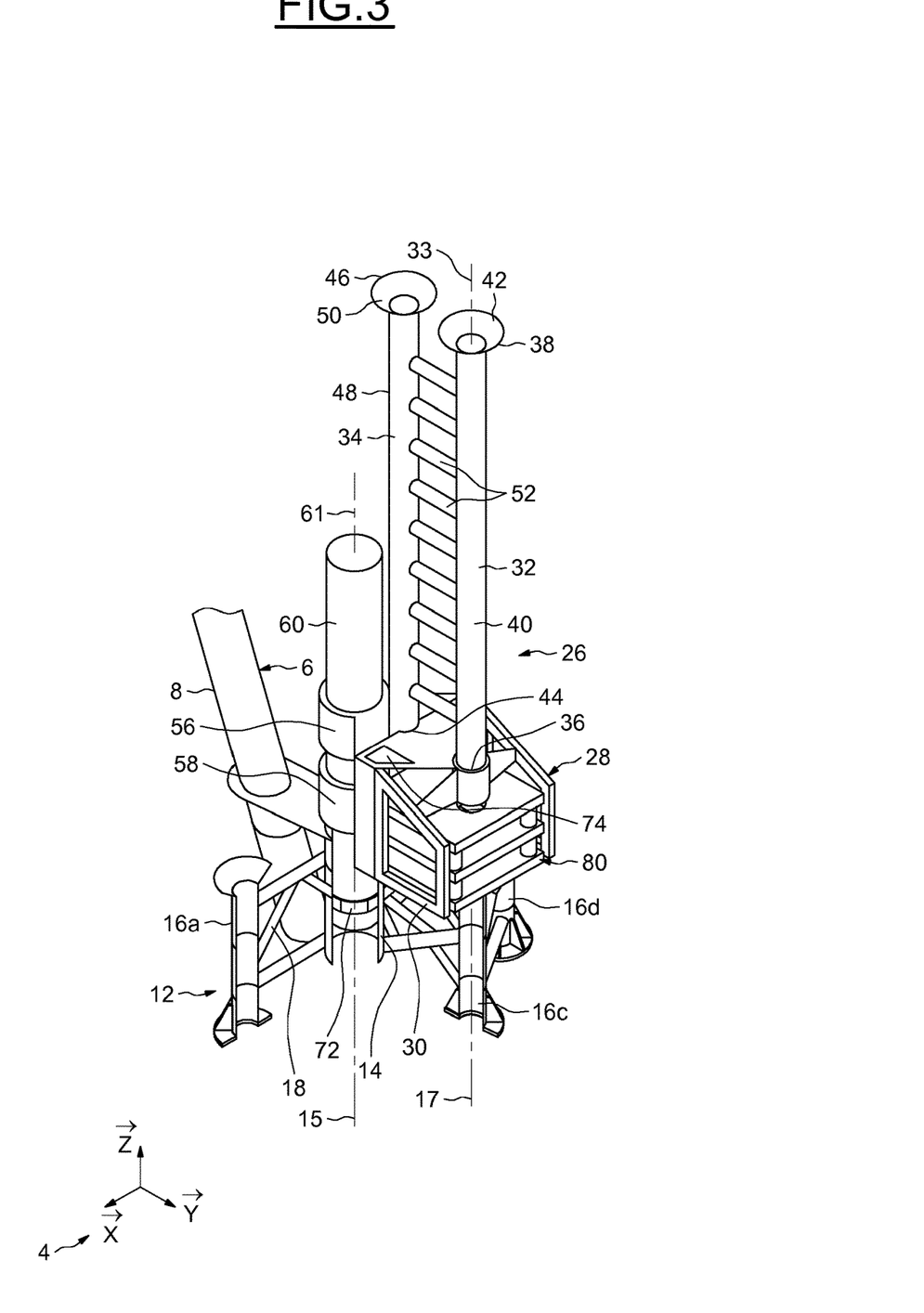
FIG. 3 is a partial cross-sectional view of the pile installation system equipping the foundation construction of FIG. 1.

With reference to FIG. 2, the adapter 12 includes a central sleeve 14 and five peripheral sleeves 16a, 16b, 16c, 16d, 16e. Nonetheless, a different number of peripheral sleeves 16a-e may be foreseen, for instance six peripheral sleeves. The sleeves 14 and 16a-e are cylindrical about the direction of the vector $\vec{z}$. FIG. 3 depicts the axis of revolution 15 of the sleeve 14 and the axis of revolution 17 of the sleeve 16c. The sleeves 16a-e are all located on a circle about the axis of the sleeve 14, said circle having a radius $r_{14-16}$. The sleeve 14 and the sleeves 16a-e have a circular radial cross-section. The diameter $d_{16}$ of the radial cross section is substantially the same for all the sleeves 16. The diameter $d_{14}$ of the radial cross section of the sleeve 14 is approximately twice the diameter $d_{16}$. More specifically, the diameter $d_{16}$ is so chosen that the adapter 12 is adapted to receive piles having a diameter $d_{22}$ within a range 0.6 m to 1.5 m. Namely, the diameter $d_{16}$ is within a range 0.6 m to 1.8 m.

Each adapter 12 includes a metallic subframe 18. The metallic subframe 18 includes a plurality of hollow sections (not referenced) and metallic plates (not referenced). For each adapter 12, the metallic subframe 18 aims at connecting the sleeve 14, the sleeves 16a-e and a joining portion for attaching the adapter 12 with a lower end of the main leg 8.

As visible on FIG. 2, each sleeve 16a-e includes an upper portion 20. For each sleeve 16a-e, the portion 20 is frustoconical about the axis of the peripheral sleeve 16a-e. More specifically, the portion 20 vertically extends between a lower circular end with a diameter $d_{20d}$ and an upper circular end with a diameter $d_{20u}$. The diameter $d_{20d}$ equals the diameter $d_{16}$ and the diameter $d_{20u}$ is larger than the diameter $d_{20d}$. Preferably, the angle of the frustoconical shape of the portion 20 with respect to the vector $\vec{z}$ is within a range 40° to 55°. The frustoconical shape of the portion 20 helps inserting a foundation pile 22 in a sleeve 16a-e in order to secure the offshore foundation construction 2 to the seabed 3.

Each peripheral sleeve 16a-e includes a lower, enlarged portion 23. More particularly, the portion 23 includes a lower frontal surface 24 intended to rest on the seabed 3. The surface 24 forms a disc perpendicular to the vector $\vec{z}$. The portion 23 includes a plurality of, for instance eight, vertical uprights 25 intended to increase the rigidity of the connection between the portion 23 and the sleeve 16a-e.

FIG. 3 is a partial cross-sectional view of the adapter 12. Namely, the cross-sectional view of FIG. 3 is taken along two secant planes, the first of which including the two respective axes of revolution of the sleeves 16a and 14, the second of which including the two respective axes of revolution of the sleeves 14 and 16c.

The construction 2 is equipped with a system 26. On FIG. 3 as well as on FIGS. 4 and 5, the adapter 12 is depicted in cross-section whereas the representation of the system 26 is not in cross-section. The system 26 is intended to install the foundation piles 22 into the seabed 3. The system 26 is not shown on FIGS. 1 and 2 for a better clarity of the drawings.

The system 26 includes a main body 28 including a frame 30, a first elongated sleeve 32 and a second elongated sleeve 34. The sleeves 32 and 34 extend vertically, upwards from the frame 30. More specifically, the sleeves 32 and 34 have substantially the same shape and length.

The sleeve 32 extends axially between a first axial end 36 and a second axial end 38. The end 36 is proximal to the frame 30 whereas the end 38 is distal to the frame 30. More specifically, the sleeve 32 is connected to the frame 30 by its first end 36. The sleeve 32 includes a cylindrical portion 40 and a frustoconical portion 42. The portion 40 is cylindrical about the direction of an axis of revolution 33 parallel to the vector $\vec{z}$. The portion 40 has a circular radial cross-section having a diameter $d_{40}$. The portion 42 vertically extends between a lower circular end with a diameter $d_{42d}$ and an upper circular end with a diameter $d_{42u}$. The diameter $d_{42d}$ equals the diameter $d_{40}$ and the diameter $d_{42u}$ is larger than the diameter $d_{42d}$:

$$d_{42d}=d_{40}$$

$$d_{42d}<d_{42u}$$

Preferably, the angle of the frustoconical shape of the portion 42 with respect to the vector $\vec{z}$ is within a range 40 to 50°. The frustoconical shape of the portion 42 helps inserting a foundation pile 22 in the sleeve 32 in order to drive the pile 22 into the seabed 3.

As well as the sleeve 32, the sleeve 34 is connected by a proximal end 44 to the frame 30. The sleeve 34 includes a distal end 46 opposite to the end 44. The sleeve 34 includes a cylindrical portion 48 and a frustoconical portion 50 located at the end 46. The diameter $d_{48}$ of the circular radial cross-section of the portion 48 equals the diameter $d_{50d}$ of a lower circular end of the portion 50. The diameter $d_{50d}$ is smaller than the diameter thou of an upper circular end of the portion 50.

The main body 28 further includes a plurality of horizontal beams 52 joining the portions 40 and 48. In the depicted embodiment, ten beams 52 are provided.

Figure 4:
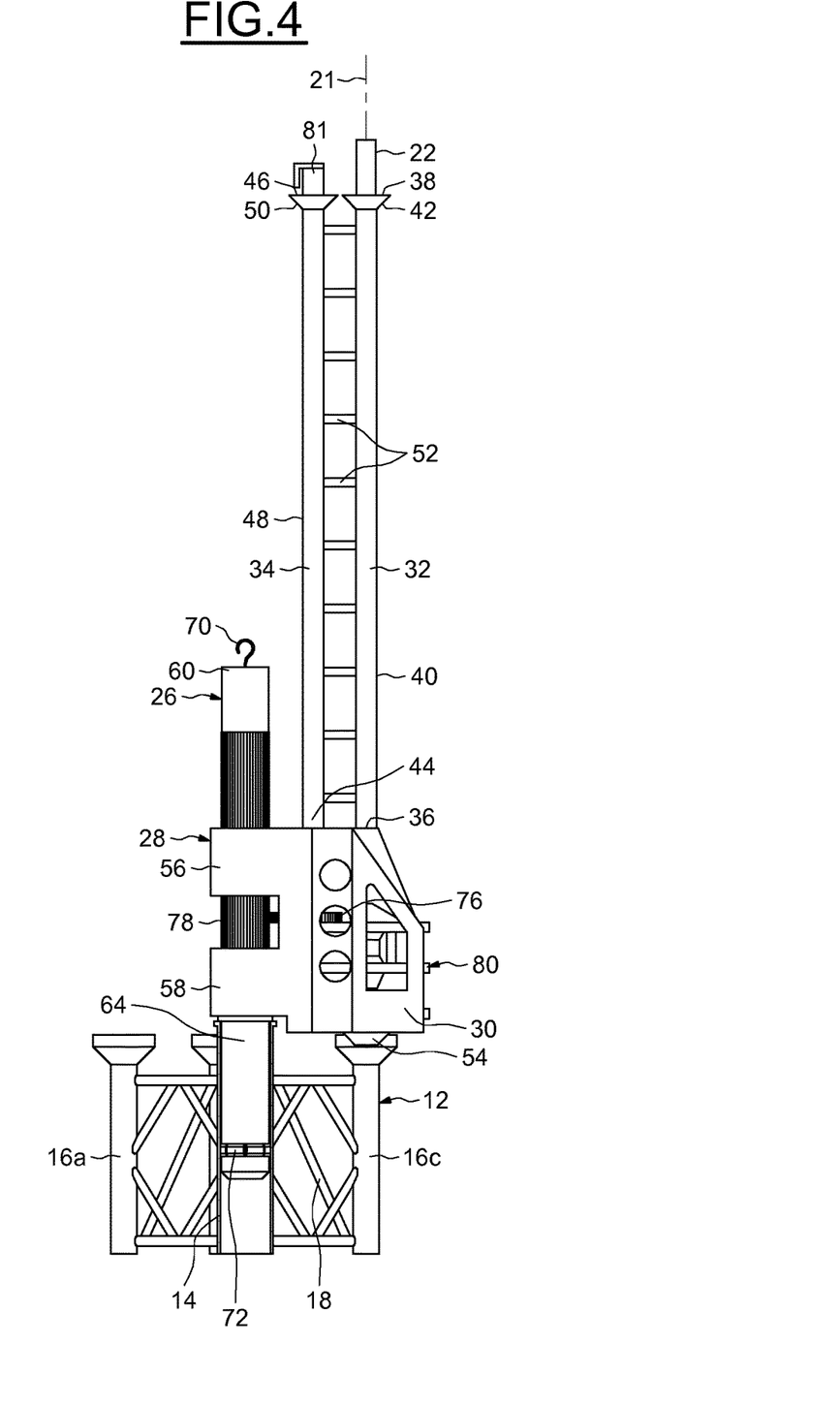
FIG. 4 is a side, partial cross-sectional view of the main body of the pile installation system of FIG. 3.

Referring to FIGS. 3 and 4, the main body 28 includes a first cylinder 56 and a second cylinder 58. The cylinders 56 and 58 are substantially identical and cylindrical about the direction of the vector $\vec{z}$. In particular, the cylinders 56 and 58 have a circular radial cross-section, the same axis of revolution and the same diameters. The distance between the axis of revolution of the cylinder 56 and the axis 33 equals the radius $r_{14-16}$. By virtue of this feature, the cylinders 56 and 58 are located above the sleeve 14 whereas the sleeve 32 is located above a sleeve 16a-e. The cylinders 56 and 58 are hollow. More specifically, the cylinders 56 and 58 are radially (with reference to their own axis of revolution), inwardly delimited by an inner cylindrical surface having a circular radial cross-section with a diameter $d_{56i}$.

Figure 5:
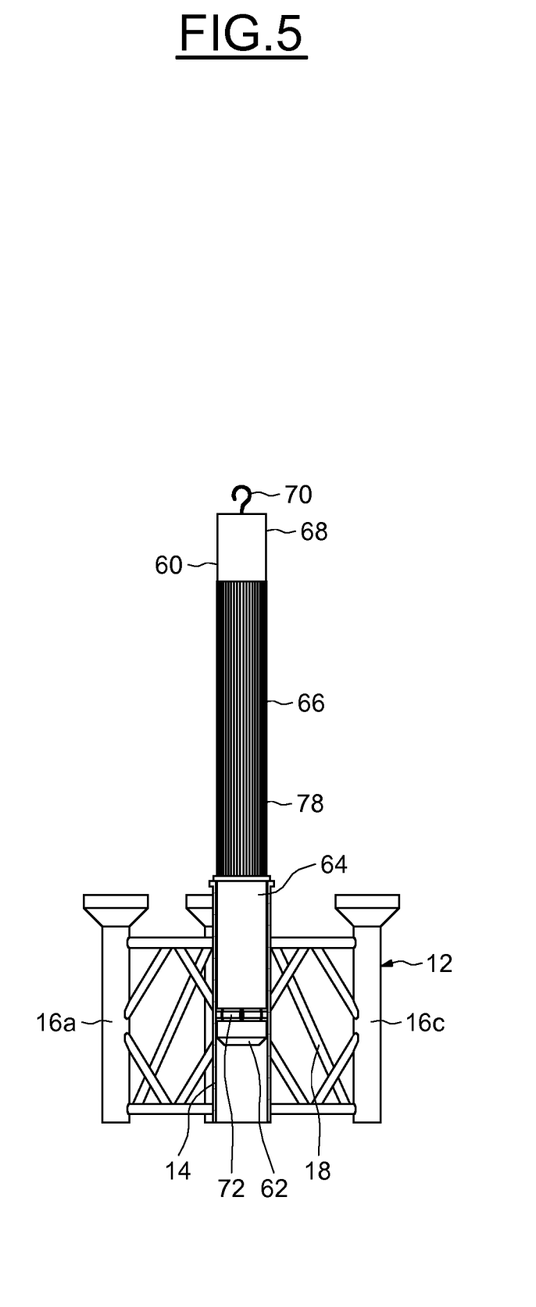
FIG. 5 is a side, partial cross-sectional view of a rod of the pile installation system of FIGS. 3 and 4.

With reference to FIGS. 3 to 5, the system 26 includes a rod 60. The rod 60 is substantially cylindrical about the direction of an axis of revolution 61 parallel to the vector $\vec{z}$. The rod 60 includes a first portion 62, a second portion 64, a third portion 66 and a fourth portion 68.

As may be seen on FIG. 5, the portion 62 extends axially, upwards from the lower end of the rod 60. The portion 62 is tapered and extends vertically between a lower circular end having a diameter $d_{62d}$ and an upper circular end having a diameter $d_{62u}$. The diameter $d_{62d}$ is smaller than the diameter $d_{62u}$:

$$d_{62d} \leq d_{62u}$$

The portion 64 extends axially upwards from the portion 62. The portion 66 extends axially upwards from the portion 64. The portion 68 extends axially between the portion 66 and an upper axial end of the rod 60. The portion 66 is received in the cylinders 56 and 58 whereas the portion 64 is intended to be received in the sleeve 14, as shown on FIGS. 4 and 5. The portions 64, 66 and 68 are cylindrical about the axis of the rod 60. More specifically, the portions 64, 66 and 68 have a substantially circular radial cross-section about the same axis 61 parallel to the vector $\vec{z}$ with a diameter $d_{60}$ slightly smaller than the diameter $d_{56i}$. At its upper end, the rod 60 includes a lifting device 70 that may be used for lifting the system 26.

As visible on FIGS. 4 and 5, the portion 64 includes a plurality of radially movable chucks 72. In the depicted embodiment, eight chucks 72 are provided. The chucks 72 are actuated by a hydraulic force. When actuated, the chucks 72 are moved radially outwards, with reference to the axis 61, so as to exert a radial effort on the inner cylindrical surface of the sleeve 14.

In an embodiment not represented, a second row of chucks can be provided on portion 64. This improves the resistance of the attachment of main body to the sleeve 14.

With reference to FIGS. 3 and 4, the main body 28 includes an electric motor 74 and a pinion 76. The motor 74 actuates the pinion 76 in rotation about the direction of the vector $\vec{z}$. The portion 66 includes a plurality of outer axial grooves 78 engaging the teeth of the pinion 76. By virtue of this arrangement, the motor 74 is able to actuate a rotation motion of the main body 28 with respect to the rod 60, about the axis 61 of the rod 60. Grooves are advantageous because it allows saving space and it is adapted to the shape of the rod 60. In a preferred embodiment, the grooves 78 form flutes spread over the surface of the portion 64. Nonetheless, the grooves 78 may be replaced with any suitable means for engaging the pinion 76, such as, for instance, teeth adapted to the teeth of the pinion 76.

The system 26 includes a mobile casing 80. The casing 80 is accommodated inside the frame 30. The casing 80 may be attached to the main body 28. When not attached, the casing 80 may be moved vertically with respect to the main body 28. The casing 80 is mechanically connected to a lifting device 81 accommodated within the sleeve 34. The casing 80 includes a tapered protuberance 54. The protuberance 54 is located in the axial prolongation of the sleeve 32, that is, the protuberance 54 is tapered about the axis 33. More specifically, the protuberance 54 extends vertically between a lower circular end having a diameter $d_{54d}$ and an upper circular end having a diameter $d_{54u}$. The diameter $d_{54d}$ is smaller than the diameter $d_{54u}$:

$$d_{54d} < d_{54u}$$

The protuberance 54 is joined to the casing 80 by its upper end. The protuberance 54 allows centering the system 26 with respect to a sleeve 16a-e.

Figure 6:
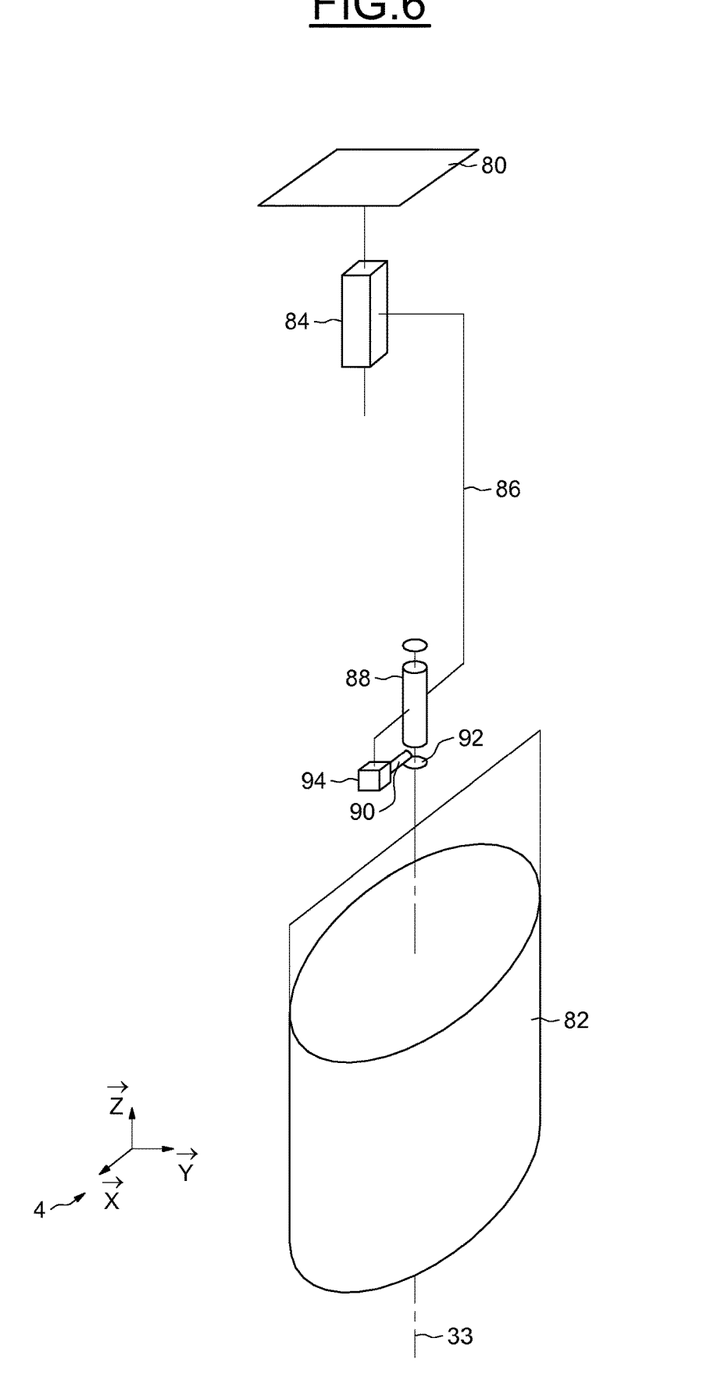
FIG. 6 is a kinematic diagram of a movable part of the system of FIGS. 3 to 5.

Referring now to FIG. 6, the casing 80 accommodates a movable part 82. The part 82 is cylindrical about the axis 33. More specifically, the part 82 has a circular radial cross-section about the axis 33. The part 82 is able to move in translation about the axis 33 with respect to the casing 80. The part 82 is further able to move in rotation about the axis 33 with respect to the casing 80. In order to actuate a motion of the part 82 with respect to the casing 80, the casing 80 accommodates a translation actuator 84, an intermediate part 86 and a rotation actuator 88.

The actuator 84 mechanically connects the casing 80 to the part 86. In other words, the part 86 is actuated in translation motion about the direction of the axis 33 with respect to the casing 80. In the depicted embodiment, the actuator 84 is a hydraulic jack.

The actuator 88 mechanically connects the parts 86 and 82, that is, the part 82 is actuated in rotation motion about the axis 33 with respect to the part 86. In the depicted embodiment, the actuator 88 includes a driving screw 90 and a ring gear 92. The ring gear 92 is attached to the part 82 whereas the driving screw 90 is driven in rotation by an electric motor 94. The driving screw 90 and the ring gear 92 are also commonly referred as a worm or pinion gear.

Figure 7:
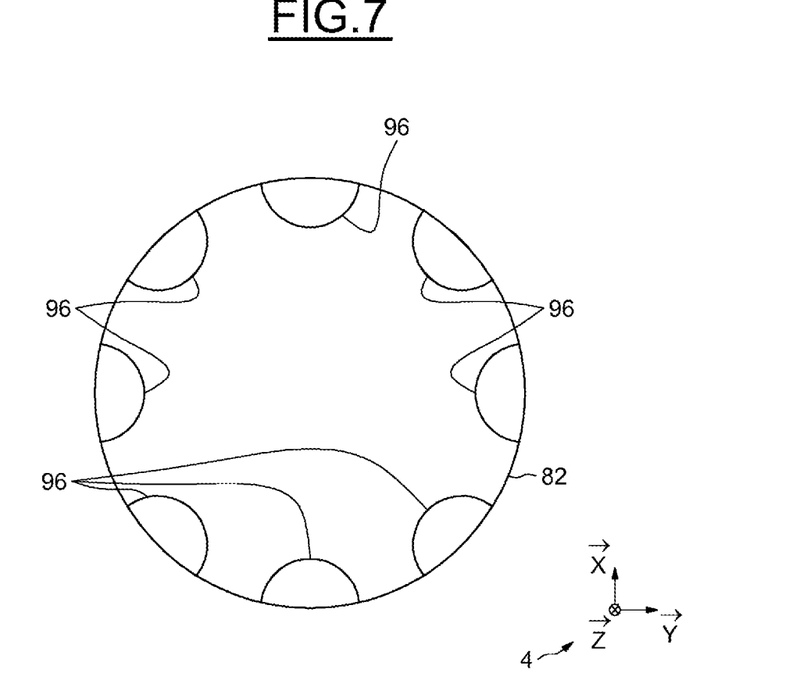
FIG. 7 shows schematically a bottom view of the movable part of FIG. 6.

With reference to FIG. 7, the part 82 includes a plurality of radially movable hydraulic chucks 96. In the depicted embodiment, eight chucks 96 are provided. When actuated, the chucks 96 are moved radially inwards with respect to the part 82, with reference to the axis 33. By virtue of this arrangement, a radial inwards effort is exerted by the chucks 96 on the outer cylindrical surface of a pile 22 received inside the part 82. The pile 22 is manipulated in translation and in rotation by the part 82 from outside the pile 22. That is, when the pile 22 is manipulated by the part 82, the part 82 is located around the pile 22.

Figure 8:
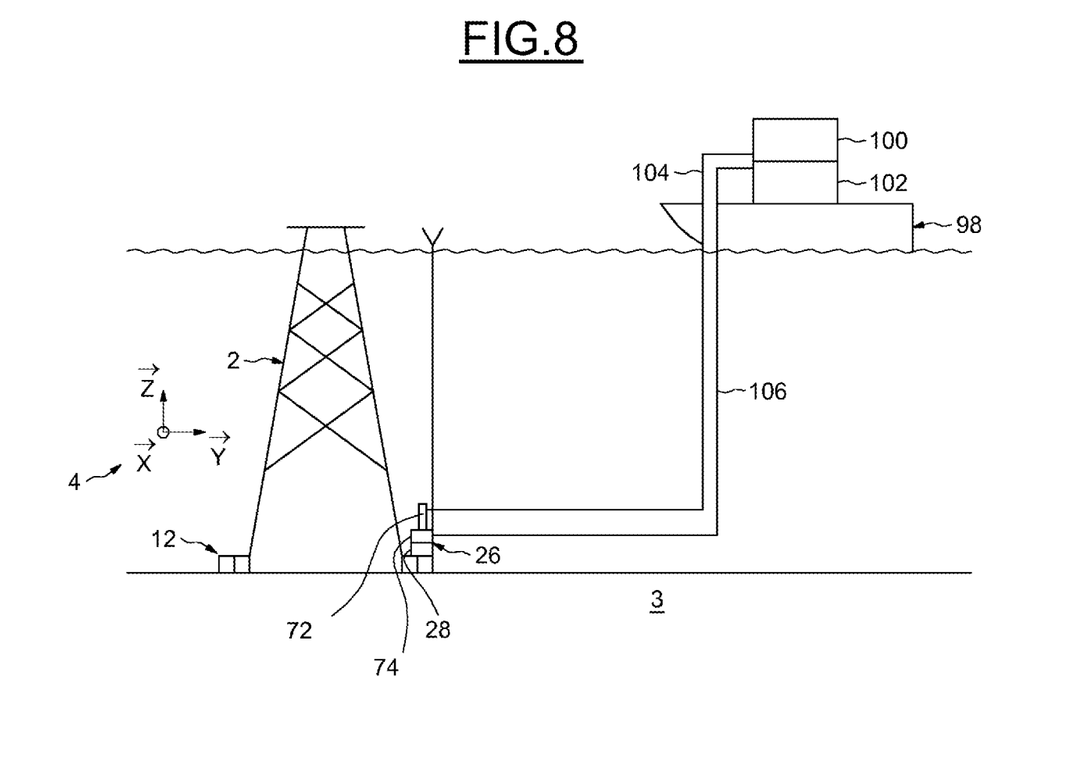
FIG. 8 is a schematic diagram of a vessel, of the offshore foundation construction and of the pile installation system of FIGS. 1 to 7.

With reference to FIG. 8, the system 26 is schematically depicted together with the offshore foundation construction 2 and an installation vessel 98. The vessel 98 includes a hydraulic power generation unit 100 and an electric power generation unit 102. The system 26 includes a hydraulic hose 104 connecting the unit 100 to the jack 84 and to the chucks 72 and 96. The system 26 further includes an electric supply circuit 106 providing the motors 74 and 94 with electric power generated by the unit 102.

In the depicted embodiment, the jack 84 and the chucks 72 and 96 are actuated by hydraulic energy and the motors 74 and 94 are actuated by electric energy. Nonetheless, one may foresee replacing these actuators with actuators using a different energy, such as a hydraulic motor, an electric jack, pneumatic chucks, etc.

Another means than the chucks 72 may be foreseen for fastening the body 28 to the offshore foundation construction 2. Such a means for fastening may connect mechanically the body 28 to the structure 6 or to a leg 8 or a brace 10. As well, the means for fastening may connect the body 28 to an upper part 20 of a sleeve 16a-e of an adapter 12.

By virtue of the system 26, the following installation method may be implemented in order to drive piles 22 into the seabed 3. In the depicted embodiment, twenty piles 22 are installed so as to secure the construction 2 to the seabed 3.

Firstly, the offshore foundation construction 2 is installed so that its adapters 12 rest on the seabed 3.

Then the rod 60 is lowered so that the portion 64 is accommodated inside central sleeve 14. Then, the chucks 72 are provided with hydraulic power so that they move radially outwards with reference to the axis 61. By doing so, they exert a radial outwards pressure on the inner surface of the sleeve 14. In this way, the rod 60 is firmly secured to the adapter 12.

Then, the main body 28 is lowered in the vicinity of an adapter 12 by means of the lifting device 81. The main body 28 is guided so that the axis 61 matches with the axis 15 and the axis 33 matches with the axis of revolution of the sleeve 16a. Then, the main body 28 is positioned onto part 60 and then lowered along part 60 so that the protuberance 54 is accommodated in the upper portion 20 of the sleeve 16a.

Then, a pile 22 is inserted in the sleeve 32 and slowly lowered from the end 38 to the end 36. When the pile 22 gets through the part 82 and contacts the seabed 3, the chucks 96 are provided with hydraulic power so that they move radially inwards with reference to the axis 33. The pile 22 is thus fastened to the part 82.

Then, the jack 84 and the motor 94 are provided with hydraulic and electric power, respectively. By doing so, the part 82 is actuated in a motion of vertical downwards translation with or without rotation about the axis 33 and exerts an installation force on the pile 22 in such a way that the pile 22 is installed into the seabed 3. The installation force is regularly exerted and has a smaller value than the installation force normally exerted with the hammering method.

When the installation of the pile 22 is complete, the chucks 96 are released and the casing 80 is vertically upwards lifted by means of the lifting device 81. By doing so, the protuberance 54 is extracted from the upper part 20 of the sleeve 16a.

Then, the motor 74 is provided with electric power. More specifically, the motor 74 is actuated so as to pivot the main body 28 with respect to the rod 60 about the axis 61. The main body 28 is pivoted until the axis 33 matches with the axis of revolution of the sleeve 16b. Then, the lifting device 81 is released and the protuberance 54 is accommodated inside the upper part 20 of the sleeve 16b.

The steps mentioned above are then repeated in such a way that another pile 22 is inserted in the sleeve 16b and installed below the seabed 3. The same steps are also repeated concerning the sleeves 16c, 16d and 16e.

When the five foundation piles 22 respectively associated with each of the sleeves 16a-e have been installed, the main body 28 is lifted off the rod 60 by means of device 81. Then the chucks 72 are loosened and the rod 60 is lifted by means of the device 70. The system 26 is then placed on another adapter 12 in order to install the piles 22 associated with the other adapter. When all the piles associated with the four adapters 12 of the construction 2 are installed, the system 26 is removed. Then, the installation method is complete.

In the first embodiment depicted on FIGS. 1 to 8, the axes 17, 21 and 33 are parallel to the vector $\vec{z}$. Nevertheless, the piles 22 may be inserted in an insertion direction which is not parallel to the vector $\vec{z}$.

Figure 9:
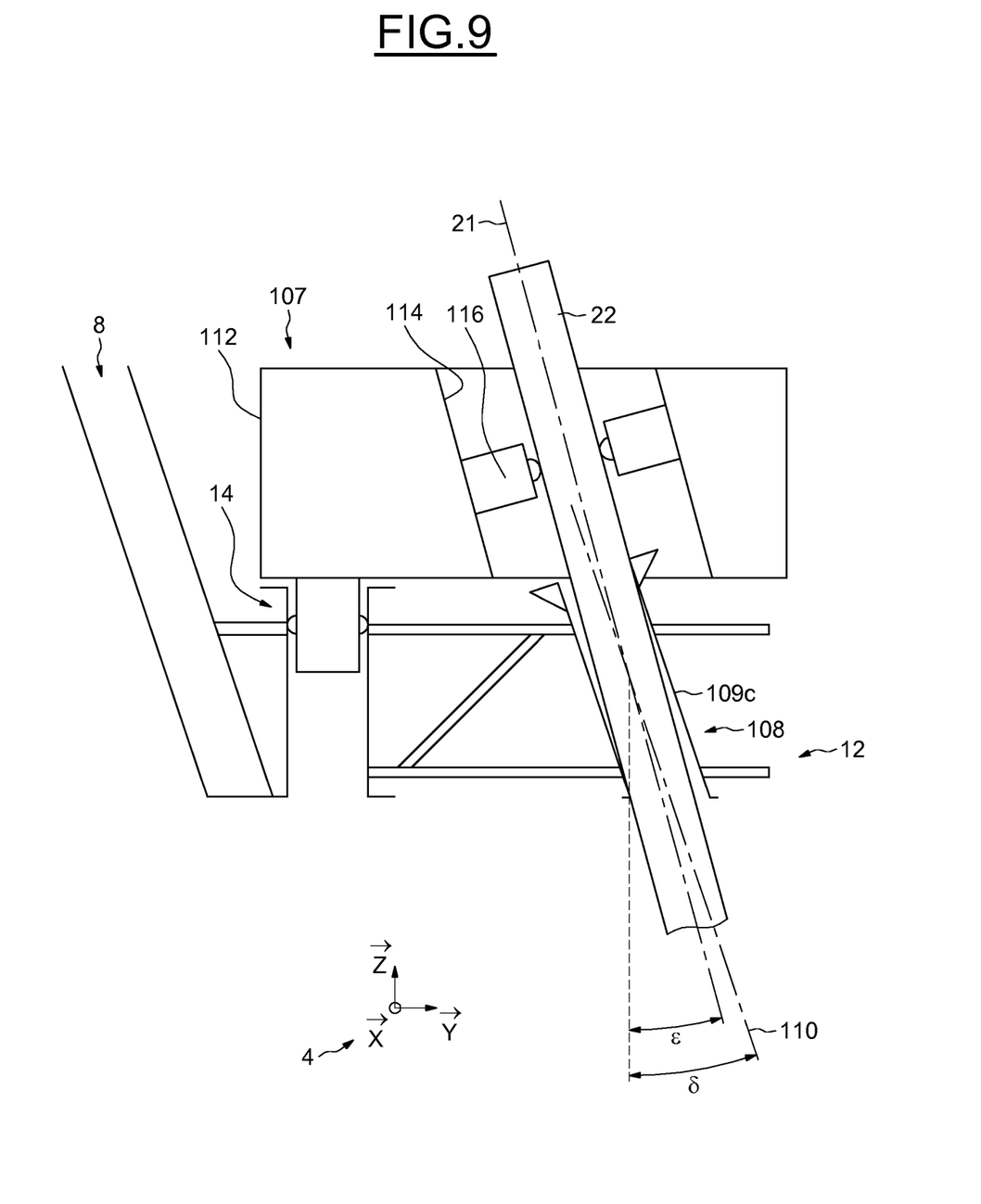
FIG. 9 is a side, partial cross-sectional view of a pile installation system according to a second embodiment.

Namely, FIG. 9 depicts a second embodiment of a pile installation system 107 on which the same elements have the same references. With reference to FIG. 8, the system 107 is intended to cooperate with an adapter 108 including a plurality of peripheral sleeves. One peripheral sleeve 109c is visible on the cross-sectional view of FIG. 9. The peripheral sleeve 109c differs from the peripheral sleeve 16c of the first embodiment in that its axis of revolution 110 is inclined with respect to the vector $\vec{z}$. The angle δ between the axis 110 and the vector $\vec{z}$ may be up to 30° and is, preferably, within a range from 5° to 15°, inclusively.

The system 107 is equipped with a main body 112. The main body 112 is fastened to the adapter 108. The main body 112 includes a cylindrical cavity 114 accommodating a movable part 116. The movable part 116 includes a means for attaching (not referenced) the part 116 to the pile 22 to be installed. In the configuration depicted on FIG. 9, the cavity 114 and the movable part 116 are located in the axial extension of the axis 110. More specifically, the movable part 116 may be actuated, with respect to the main body 112, in a translation motion along the axis 110 and in a rotation motion about the axis 110. The system 107 may be provided with an elongated sleeve (not depicted) such as the elongated sleeve 32 of the system according to the first embodiment. In such case, the axis of revolution of the elongated sleeve forms an angle ε with the vector $\vec{z}$. Preferably, the difference between the angles δ and ε is, preferably, smaller than 0.5°.

Figure 10:
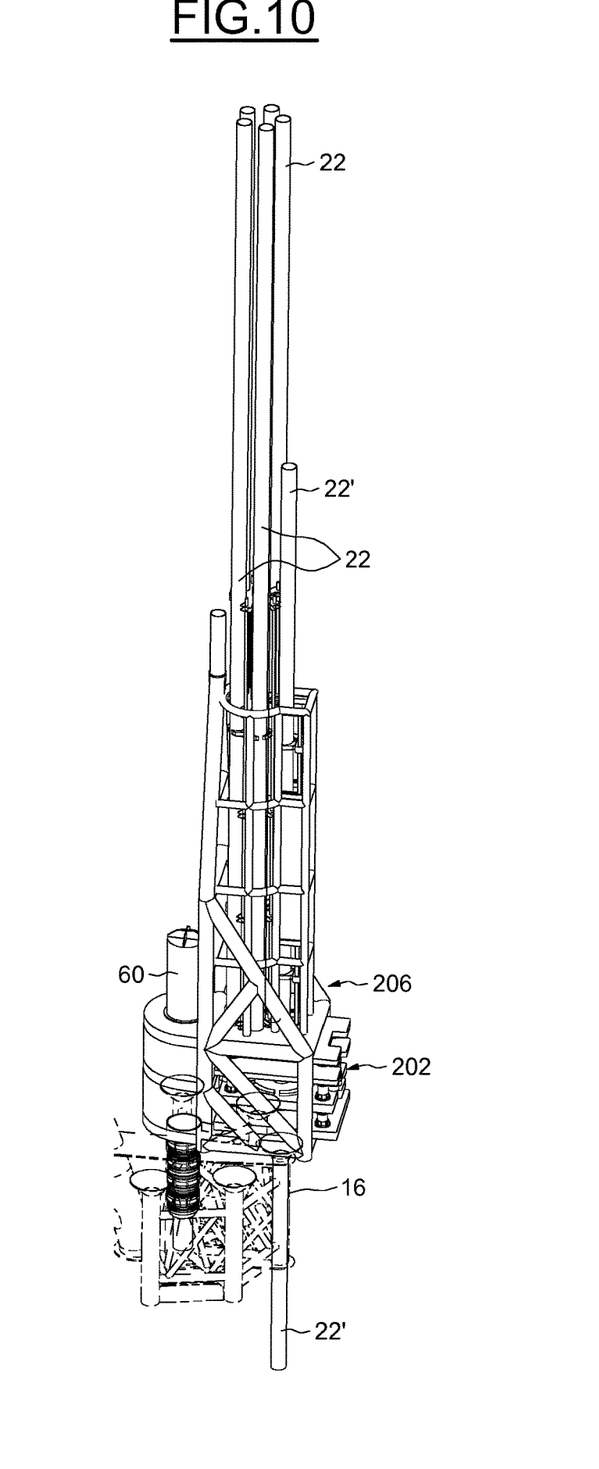
FIG. 10 is a perspective view of a pile installation system according to another embodiment.
Figure 11:
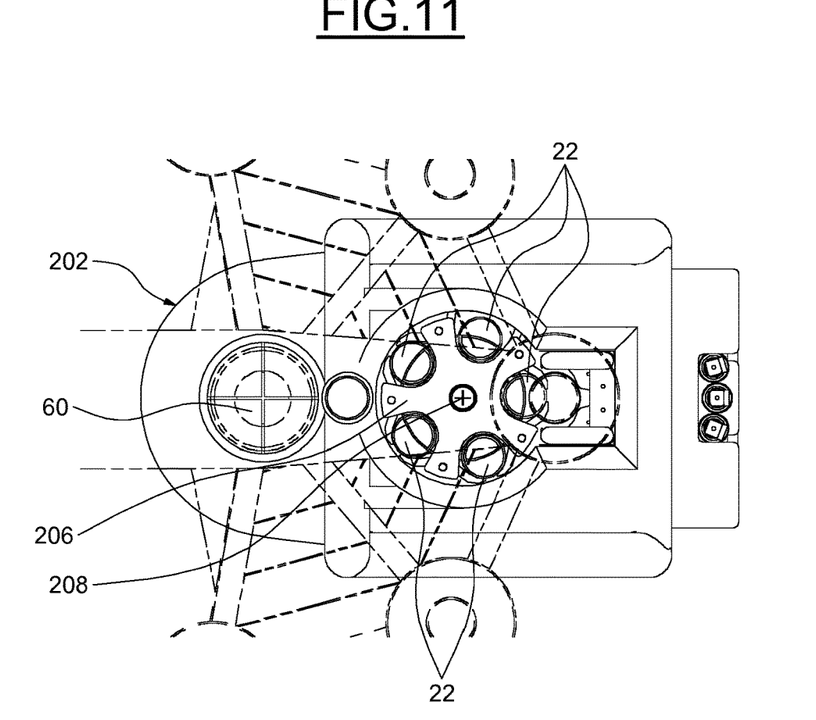
FIG. 11 is a bottom view of the pile installation system of FIG. 10.

With reference to FIGS. 10 and 11, a pile installation system 202 differs from the pile installation system 26 in that it includes a carrousel 206 so configured to accommodate piles 22, to pivot the piles about a pivot axis 208, and to supply them, one at a time, for installation. The pivot axis 208 may be parallel to the vector $\vec{z}$ and located at a center of the carrousel 206.

In the example embodiment of FIGS. 10 and 11, the carrousel 206 can accommodate 5 piles 22 and pivot so that a pile 22 can be placed above a corresponding sleeve 16, Once positioned, a pile 22 can be brought down in a sleeve 16 for installation. As illustrated in FIG. 10, a pile is a first position when in the carrousel 206 (reference 22) and in a second position when brought down (reference 22').

Figure 12:
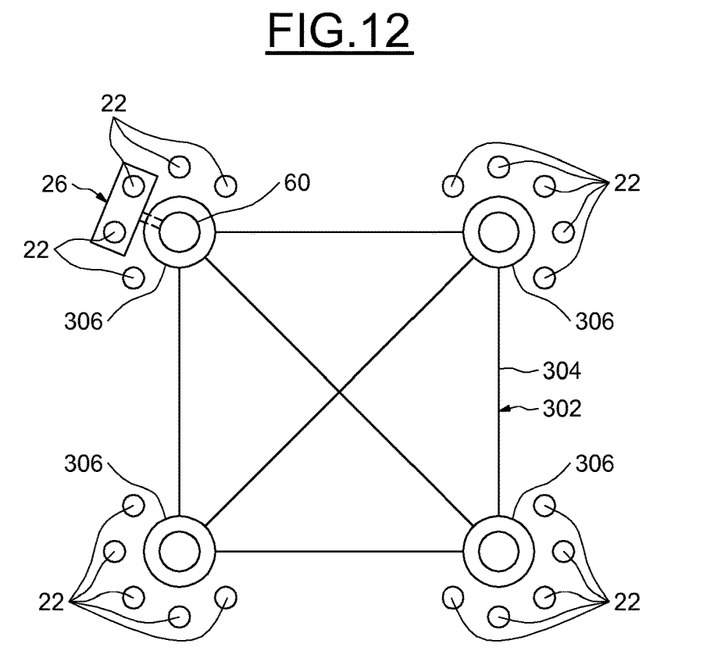
FIG. 12 shows schematically a bottom view of a template and a pile installation system according to yet another embodiment.

With reference to FIG. 12, a template 302 may be laid on seabed prior to installation of the piles. The template 302 includes a substructure 304 connecting together sleeves 306. The example embodiment of FIG. 12 includes four sleeves 306. A pile installation system, being in the depicted embodiment the pile installation system 26, may be pre-assembled to the template 302. The template 302 may be the frame of reference. In a possible variation of the embodiment shown in FIG. 12, the piles 22 may be installed all around the sleeves 306.

When using a template 302, the method of installing an offshore foundation construction 2 may include placing the template 302 on the seabed, installing piles 22 in the seabed, removing the template 302 and fitting the offshore foundation construction 2 or any part of the offshore foundation construction 2, such as a structure 6 or one or more adapters 12, onto the piles 22. When fitting a part of the offshore foundation construction 2, the method further includes installing the remaining parts of the offshore foundation construction. For example, a template 302 is placed on the seabed, piles 22 are installed, the template 302 is removed, adapters 12 are fit onto the piles 22 and a structure 6 is fit on the adapters 12. In an alternative example the template 302 is placed on the seabed, the piles 22 are installed in parallel with the adapters 12, adapters 12 and piles 22 are connected, the template 302 is removed and a structure 6 is fit on the adapter 12. When a pile installation system 26 is assembled or pre-assembled to the template 302, both are removed when the piles 22 have been installed.

In view of the foregoing, the invention provides with a way to install a pile without generating noise and/or vibrations which are harmful to the surrounding wildlife and without deforming or weakening the foundation piles.

The invention claimed is:

1. A pile installation system for an offshore foundation construction, including a main body, a movable part and a first means for attaching the main body to a frame of reference, wherein the pile installation system further includes a second means for attaching the movable part to a pile to be installed, and in that the movable part may be moved, with respect to the main body, in translation about a direction of an insertion axis,
   wherein the first means for attaching includes a rod attached to a central sleeve of an adapter of the offshore foundation construction,
   wherein the frame of reference is one of the offshore foundation construction or a template, and
   wherein the main body is mobile in rotation with respect to the rod about an axis of the rod, the first means for attaching further including a pivoting means for actuating the rotation of the main body with respect to the axis of the rod.

2. The pile installation system according to claim 1, wherein the movable part may be moved, with respect to the main body in rotation about said insertion axis.

3. The pile installation system according to claim 1, wherein the main body includes a first elongated sleeve extending along the insertion axis.

4. The pile installation system according to claim 3, wherein a length of the first elongated sleeve is within a range 5 m to 30 m.

5. The pile installation system according to claim 3, wherein the first elongated sleeve includes a distal end portion, the distal end portion being frustoconical and having a first circular axial end adjacent to the main body and a second circular axial end opposite to the main body, the second circular axial end having a larger diameter than a diameter of the first circular axial end.

6. The pile installation system according to claim 1, wherein the main body includes a second elongated sleeve including a lifting device.

7. The pile installation system according to claim 1, including a carrousel so configured to accommodate at least two piles, to pivot the piles about a pivot axis and to supply the piles one at a time for installation.

8. The pile installation system according to claim 1, further including a power generation unit and a driving unit, the driving unit being intended to use power from the power generation unit to actuate the movable part, the power generation unit being intended to be installed on a vessel, the driving unit being installed in vicinity of the main body.

9. The pile installation system according to claim 8, wherein the power generation unit includes at least one of at least one hydraulic pump and at least one electric generator.

10. The pile installation system according to claim 8, wherein the driving unit includes at least one hydraulic actuator or at least one electric actuator.

11. The pile installation system according to claim 1, further including a transmission unit comprising a driving screw and a ring gear.

12. The pile installation system according to claim 1, wherein the second means for attaching includes at least three radially movable chucks.

13. The pile installation system according to claim 12, wherein the second means for attaching includes at least one supplementary radially movable chuck.

14. The pile installation system according to claim 1, wherein the frame of reference is the template.

15. The pile installation system according to claim 1, wherein the pivoting means includes a motor and a pinion, the rod having outer axial grooves able to cooperate with the pinion.

16. A method of installing a pile of an offshore foundation construction, including attaching the main body of a pile installation system as set forth in claim 1 to the template, providing the pile installation system with the pile to be installed, attaching the movable part of the pile installation system to the pile to be installed, and moving the movable part, with respect to the main body, in translation about the direction of an insertion axis.

17. The method according to claim 16, further including moving the movable part with respect to the main body in rotation about said insertion axis.

18. The method according to claim 17, wherein the movable part is moved, with respect to the main body, simultaneously in translation and in rotation about the insertion axis.

19. The method according to claim 16, further including using the template during installation of the pile.

20. The method according to claim 19, wherein the template is used prior to installing the offshore foundation construction or any part of the offshore foundation construction.

21. The method according to claim 20, wherein said part of the offshore foundation construction is at least one adapter or a structure.

22. The method according to claim 19, wherein the template is used together with one or more adapters of the offshore foundation construction.

* * * * *